(12) United States Patent
Mao et al.

(10) Patent No.: US 12,230,792 B2
(45) Date of Patent: Feb. 18, 2025

(54) SUPPORTER OF LITHIUM METAL AND METHODS THEREOF

(71) Applicant: Xiamen University, Fujian (CN)

(72) Inventors: BingWei Mao, Fujian (CN); Yu Gu, Fujian (CN); Hongyu Xu, Fujian (CN); Weiwei Wang, Fujian (CN); Jiawei Yan, Fujian (CN)

(73) Assignee: Xiamen University, Fujian (CN)

( * ) Notice: Subject to any disclaimer, the term of this patent is extended or adjusted under 35 U.S.C. 154(b) by 927 days.

(21) Appl. No.: 17/340,478

(22) Filed: Jun. 7, 2021

(65) Prior Publication Data

US 2021/0296641 A1    Sep. 23, 2021

Related U.S. Application Data

(63) Continuation of application No. PCT/CN2019/108328, filed on Sep. 27, 2019.

(30) Foreign Application Priority Data

Dec. 5, 2018   (CN) .......................... 201811479708.4

(51) Int. Cl.
*H01M 4/38* (2006.01)
*C25D 1/00* (2006.01)
*C25F 3/26* (2006.01)
*H01M 4/04* (2006.01)
*H01M 10/0525* (2010.01)

(52) U.S. Cl.
CPC .............. *H01M 4/382* (2013.01); *C25D 1/00* (2013.01); *C25F 3/26* (2013.01); *H01M 4/0442* (2013.01); *H01M 4/0452* (2013.01); *H01M 10/0525* (2013.01)

(58) Field of Classification Search
CPC .............. H01M 4/382; H01M 4/0442; H01M 10/0525; H01M 4/0452; C25D 1/00; C25F 3/26
See application file for complete search history.

(56) References Cited

U.S. PATENT DOCUMENTS

| | | | |
|---|---|---|---|
| 2003/0180624 A1* | 9/2003 | Oh | H01M 10/0525 29/623.5 |
| 2005/0019667 A1* | 1/2005 | Oh | C08L 83/12 29/623.5 |

FOREIGN PATENT DOCUMENTS

| | | | |
|---|---|---|---|
| CN | 101162772 A | | 4/2008 |
| CN | 105603518 A | | 5/2016 |
| CN | 105714382 | * | 6/2016 |
| CN | 105714382 A | | 6/2016 |
| CN | 108110258 A | | 6/2018 |
| CN | 108428858 | * | 8/2018 |
| CN | 108428858 A | | 8/2018 |
| CN | 108550858 A | | 9/2018 |

(Continued)

OTHER PUBLICATIONS

CN108428858 MT (Year: 2018).*

(Continued)

*Primary Examiner* — Alexander Usyatinsky
(74) *Attorney, Agent, or Firm* — Cooper Legal Group, LLC

(57) ABSTRACT

A supporter of lithium metal, a material of the supporter of lithium metal is at least one of copper, an alloy of the copper, nickel, or an alloy of the nickel, and a surface of the supporter of lithium metal comprises a lithiophilic surface.

11 Claims, 2 Drawing Sheets

(56) References Cited

FOREIGN PATENT DOCUMENTS

| CN | 109585855 A | | 4/2019 |
|---|---|---|---|
| KR | 100392173 B1 | * | 7/2003 |

OTHER PUBLICATIONS

CN105714382 MT (Year: 2016).*
KR 100392173 MT.*
Written Opinion of the International searching aouthority PCT_CN2019_108328 (Year: 2020).*
The decision of SIPO to grant a Patent right for Application CN 201811479708 (Year: 2020).*
Lin, et al., "Reviving the lithium metal anode for high-energy batteries", Published Online: Mar. 7, 2017 | DOI: 10.1038/NNANO. 2017.16, pp. 194-206.
Zhao Peng et al., "Study on the Merits of Electro deposition Copper in the Pyophosphate System," Material Protection (Supplement), vol. 41, No. 10, Oct. 31, 2008 (Oct. 31, 2008), ISSN:1001-1560, pp. 227-229.
Tao Yishi, "Effect of orientation copper and nickel coating on bonding interface reaction," Full Text Database of China's Outstanding Master's Degree Papers Engineering Science and Technology Series I,No. 02, Feb. 15, 2016 (Feb. 15, 2016), ISSN:1674-0246, body pp. 17-21, 25-27, 30.
International Search Report and English Translation cited in PCT/CN2019/108328 mailed Jan. 2, 2020, 6 pages.
Written Opinion and English Translation cited in PCT/CN2019/108328 mailed Jan. 2, 2020, 11 pages.

* cited by examiner

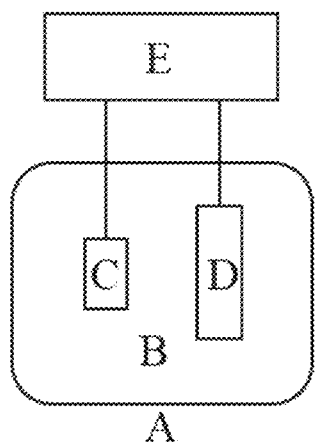
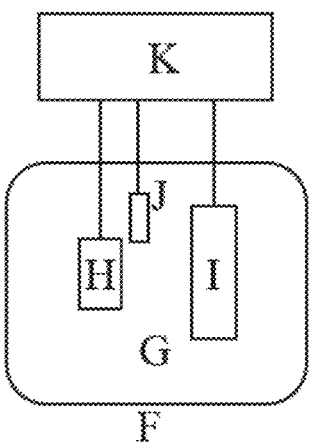
Fig. 1a
Fig. 1b
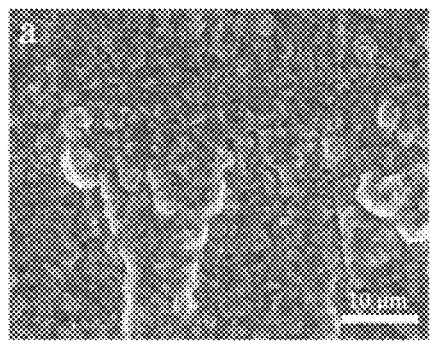
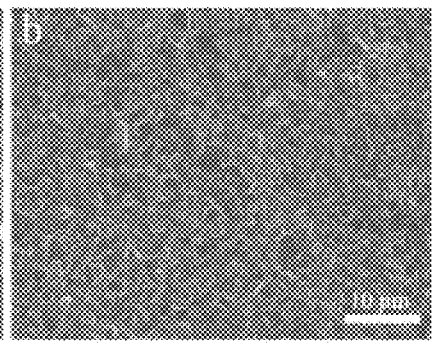
Fig. 2a
Fig. 2b
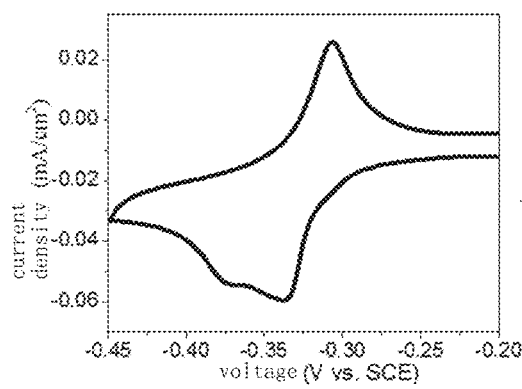
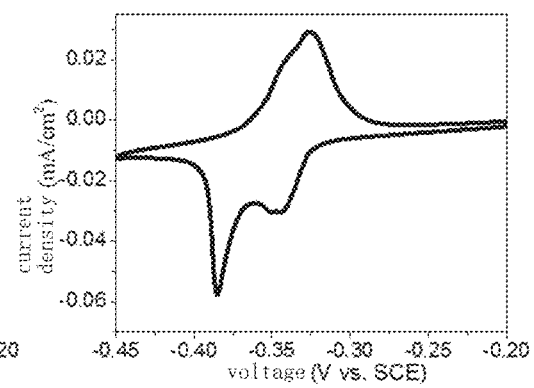
Fig. 3a
Fig. 3b

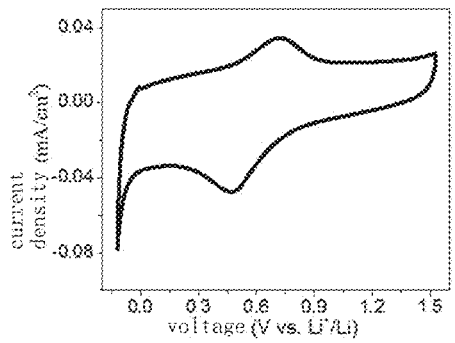 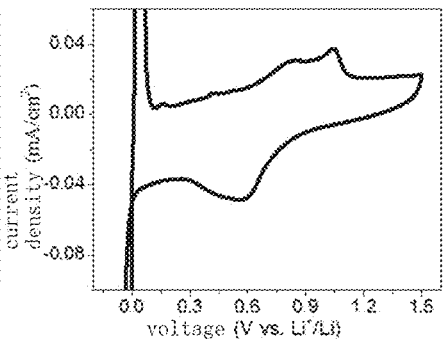
Fig. 4a  Fig. 4b
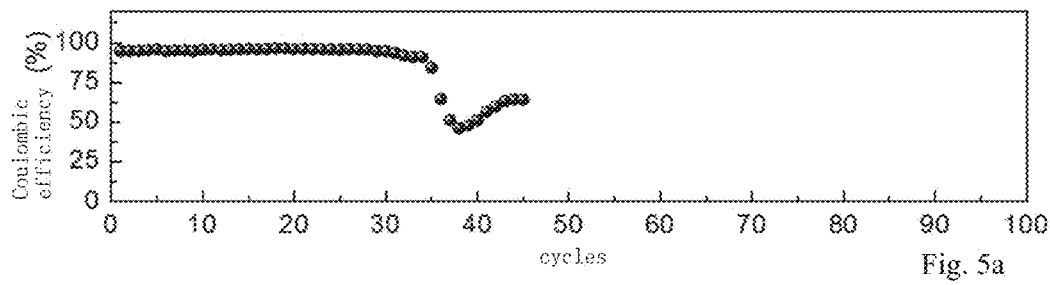
Fig. 5a
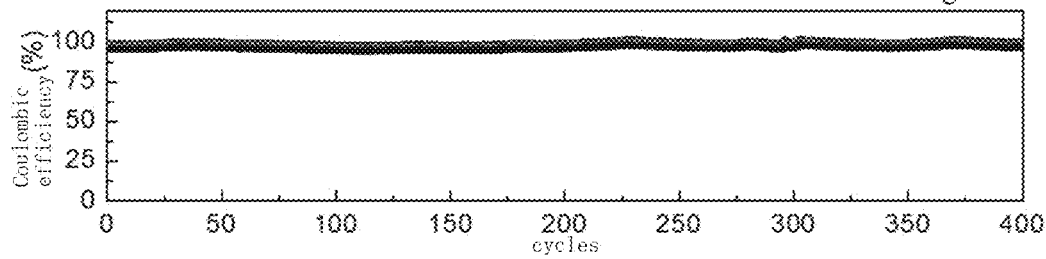
Fig. 5b
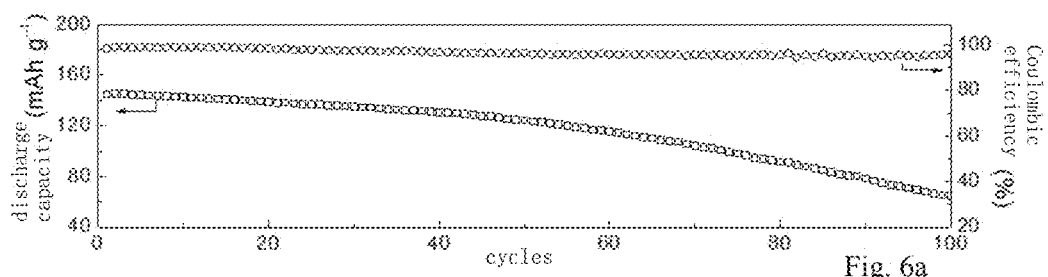
Fig. 6a
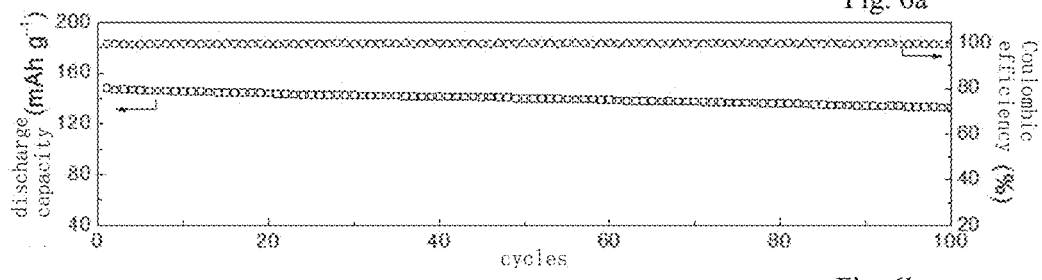
Fig. 6b

SUPPORTER OF LITHIUM METAL AND METHODS THEREOF

RELATED APPLICATIONS

This application is a continuation of International patent application PCT/CN2019/108328, filed on Sep. 27, 2019, which claims priority to Chinese patent application 201811479708.4, filed on Dec. 5, 2018. International patent application PCT/CN2019/108328 and Chinese patent application 201811479708.4 are incorporated herein by reference.

FIELD OF THE DISCLOSURE

The present disclosure relates to electrochemical technology, and in particular relates to a supporter of lithium metal and methods thereof.

BACKGROUND OF THE DISCLOSURE

Lithium metal is an ideal anode material for high-energy-density rechargeable lithium batteries because lithium metal has the advantages of high theoretical capacity and low electrode potential. However, lithium anodes suffer from dendrite growth during charging and discharging processes, which can induce an internal short circuit of the battery and result in severe safety problems. At the same time, lithium anodes undergo infinite volume change upon charge-discharge cycling, which cracks a solid-electrolyte interphase (SEI) film of the lithium anode and thus expose fresh lithium metal underneath. The newly exposed lithium metal reacts with the electrolyte, leading to corrosion of lithium anodes and, eventually, low coulombic efficiency of the battery. These issues seriously hamper the commercialization of lithium anodes.

In the past few decades, continuous efforts have been developed to suppress lithium dendrite growth and thus improve the cycle efficiency and safety of the battery. To reduce the usage of lithium metal and to reduce safety concerns, lithium thin film anodes prepared on an appropriate supporter (i.e., current collector) or even deposition and dissolution of "lithium-free" anodes have received increasing attention in recent years. As an important component of the abovementioned two types of highly utilizable lithium anodes, the supporters should be well designed, especially surface lithiophilicity of the supporters, which has an important influence on uniform lithium deposition and dissolution and thus on the long-term cycling stability of the lithium anodes. The supporters contain planar and three-dimensional configurations. Compared with planar configurations, three-dimensional supporters have higher specific surface areas, enabling lithium anodes to work under lower real current density and thus further alleviating the problem of dendrite growth. In fact, the supporter in three-dimensional configurations for the lithium anodes should not only have higher specific surface area, but also have high electroactive space to form the electrode/electrolyte interface, which can facilitate the smooth and stable cycling of lithium anodes. It is noteworthy that the high electroactive space of the supporter is closely related to the surface lithiophilicity of the supporter.

Although a number of studies have reported on improvement of the surface lithiophilicity of the supporters, most are focused on coating expensive thin layers of lithiophilic foreign substances (such as gold, silver, etc.). The impacts of microstructure of the supporter surface, especially the microscopic structure and surface orientation, on the affinity of lithium metal as well as the lithium nucleation and growth are ignored. On the other hand, extensive approaches have been proposed to design supporters with significant increasing in specific surface area. However, high electroactive space of the supporter is always unable to be realized in those cases. Therefore, it is urgent to develop strategies to improve the surface lithiophilicity of the supporter so that both the high utilization of specific surface area and electroactive space can be considered, which would enable a considerable improvement in the quality of lithium deposition and dissolution on supporters and would lay the foundation for the preparation of lithium thin film anodes and lithium-free anodes.

REFERENCES

Dingchang Lin, Yayuan Liu and Yi Cui, Reviving the lithium metal anode for high-energy batteries, Nature Nanotechnology, 2017, 12, 194-206.

BRIEF SUMMARY OF THE DISCLOSURE

In order to solve the deficiencies of existing supporters of lithium metal, a first technical solution of the present disclosure provides a supporter of lithium metal with a lithiophilic surface.

A second technical solution of the present disclosure provides a method for preparing the supporter of lithium metal with the lithiophilic surface.

A third technical solution of the present disclosure provides a method for applying the supporter of lithium metal with the lithiophilic surface.

A supporter of lithium metal, a material of the supporter of lithium metal is at least one of copper, an alloy of the copper, nickel, or an alloy of the nickel, and a surface of the supporter of lithium metal defines a lithiophilic surface.

In an embodiment, the lithiophilic surface has a Cu(100) preferred orientation (i.e., Cu(100) preferred surface) or a Ni(100) preferred orientation (i.e., Ni(100) preferred surface). The Cu(100) preferred surface or the Ni(100) preferred surface is configured to at least one of reduce the energy barrier for lithium deposition or increase lithium coverage on the supporter of lithium metal.

In an embodiment, a configuration of the supporter of lithium metal comprises at least one of a flat foil, a three-dimensional mesh, a three-dimensional foam, a three-dimensional cylinder, etc.

In an embodiment, the supporter of lithium metal is prepared in combination of electrochemical control and a crystal face capping agent. The electrochemical control comprising controlling potential and/or current to enable the supporter of lithium metal to be stripped and then deposited, resulting in a flat surface, and thus Cu(100) preferred surface or the Ni(100) preferred surface is achieved. The crystal face capping agent can be at least one of an anion, a cation, a molecule, or a combination of the anion, the cation, or the molecule that are configured to be selectively absorbed on the Cu(100) preferred surface or the Ni(100) preferred surface. The crystal face capping agent comprises at least one of potassium chloride, sodium chloride, hydrochloric acid, sodium sulfate, potassium sulfate, sulfuric acid, polyvinylpyrrolidone, cetyltrimethylammonium chloride, etc.

A method for preparing the supporter of lithium metal comprises following steps.

1) Putting a supporter into an electrochemical cell functioning as a working electrode, injecting an electropolishing solution, applying anodic potential and/or anodic current to the working electrode to enable a metal to be stripped from the working electrode (i.e., changing the anodic potential and/or the anodic current and a reaction time, which is configured to adjust kinetics of the metal anode dissolution and thus enable the supporter of lithium metal to obtain a flat surface).

2) Injecting an electrolyte comprising a crystal face capping agent into the electrochemical cell after step 1) is complete, applying cathodic potential and/or cathodic current to the working electrode to enable the metal to be deposited (i.e., changing the cathodic potential and/or the cathodic current and a reaction time, which is configured to adjust a deposition process of the metal. With the protection of crystal face capping agent, the supporter of lithium metal with Cu(100) preferred surface or the Ni(100) preferred surface is finally achieved.)

In an embodiment, in step 1), a material of the supporter is at least one of the copper, the alloy of the copper, the nickel, or the alloy of the nickel.

In an embodiment, in step 1), the anodic potential is 1-2 V, the anodic current is 100-300 mA/cm$^2$, and a reaction time is 15-60 seconds.

In an embodiment, the crystal face capping agent comprises at least one of potassium chloride, sodium chloride, hydrochloric acid, sodium sulfate, potassium sulfate, sulfuric acid, polyvinylpyrrolidone, or cetyltrimethylammonium chloride, etc.

In an embodiment, in step 2), the cathodic potential is −0.2 to −0.05 V, the cathodic current is −0.1 to −0.05 mA/cm$^2$, and a reaction time is 10-60 minutes.

The supporter of lithium metal is the supporter of lithium metal comprising the flat Ni(100) preferred surface or the flat Cu(100) preferred surface.

A method comprises the following steps.

Applying the supporter of lithium metal according to claim 1 to function as a lithium-free anode in a lithium-ion battery; or Applying the supporter of lithium metal in a lithium thin film anode of a secondary battery prepared by an electrodeposition or a molten lithium covering method.

In an embodiment, the secondary battery comprises one of the lithium-ion battery, a lithium-sulfur battery, or a lithium-oxygen battery, and a cathode material, an electrolyte, and a separator are a conventional cathode material, a conventional electrolyte, and a conventional separator of the lithium-ion battery, the lithium-sulfur battery, and the lithium-oxygen battery.

Compared with the existing techniques, the present disclosure has the following advantages.

1. For the first time on a microscopic scale, the supporter of lithium metal with lithiophilic surface is created by surface preferred orientation approach (i.e., electrochemical faceting), ensuring uniform and stable lithium electrodeposition, and opening up a new idea of designing supporters of lithium metal from the perspective of surface science.

2. A simple surface preferred orientation method involving electrochemical control combined with crystal face capping agent is established to obtain the supporter of lithium metal with lithiophilic surface. Such method can be used for achieving supporters of lithium metal with flat lithiophilic surface in various configurations.

3. The obtained supporters of lithium metal with flat lithiophilic surface in various configurations can be directly used for the preparation of lithium thin film anodes by electrodeposition or molten lithium covering method without the introduction of expensive thin layers of lithiophilic foreign substances (such as gold, silver, etc), which lays the foundation for the further development of low-cost lithium thin film preparation technology.

4. The obtained supporters of lithium metal with flat lithiophilic surface in various configurations, especially for the three-dimensional supporters, can achieve the high utilization of supporter surface and space without the introduction of expensive thin layers of lithiophilic foreign substances.

5. The obtained supporters of lithium metal with flat lithiophilic surface in various configurations can be used for the preparation of lithium thin film anodes by electrodeposition or molten lithium covering method or can be directly used as lithium-free anodes for batteries (i.e., secondary batteries), greatly reducing the usage of lithium metal and thus providing a strategy to improve the safety and operability of secondary batteries.

6. The preparation method of the present disclosure can be extended to other supporters of metals (such as sodium metal, potassium metal).

7. A surface lithiophilicity of the supporter of lithium metal is improved, a high specific surface and a high electroactive space are ensured to improve a behavior of lithium deposition-dissolution on the supporter, which greatly improves electrochemical performance of the supporter of lithium metal.

BRIEF DESCRIPTION OF THE DRAWINGS

FIG. 1 illustrates a view of an apparatus of the present disclosure configured to process an electrochemical faceting method.

FIGS. 2a-2b illustrate scanning electron micrographs (SEMs) of a normal copper foil supporter and a copper foil supporter with a flat lithiophilic surface prepared according to Embodiment 2. FIG. 2a illustrates the normal copper foil supporter, and FIG. 2b illustrates the copper foil supporter with the flat lithiophilic surface prepared according to Embodiment 2.

FIGS. 3a-3b illustrate cyclic voltammograms of the normal copper foil supporter and a copper foil supporter with the flat lithiophilic surface prepared according to Embodiment 4 in a Pb(ClO$_4$)$_2$ aqueous solution. FIG. 3a illustrates the normal copper foil supporter, and FIG. 3b illustrates the copper foil supporter with the flat lithiophilic surface prepared according to Embodiment 4.

FIGS. 4a-4b illustrate cyclic voltammograms of the normal copper foil supporter and a copper foil supporter with the flat lithiophilic surface prepared according to Embodiment 10 in a electrolyte of LiTFSI/DME-DOL (1/1, volume-to-volume (V/V) ratio). FIG. 4a illustrates the normal copper foil supporter, and FIG. 4b illustrates the copper foil supporter with the flat lithiophilic surface prepared according to Embodiment 10.

FIG. 5a-5b illustrate performance graphs of a normal copper mesh supporter and a copper mesh supporter with a flat lithiophilic surface prepared according to Embodiment 17 directly used as lithium-free electrodes. FIG. 5a illustrates a cyclic Coulombic efficiency diagram of a copper-lithium battery comprising the normal copper mesh supporter and a metal lithium electrode at 4 mA·cm$^{-2}$ (1 mAh·cm$^{-2}$), and FIG. 5b illustrates a cyclic Coulombic efficiency diagram of a copper-lithium battery comprising a copper mesh supporter with a flat lithiophilic surface prepared according to Embodiment 17 and a metal lithium electrode at 4 mA·cm$^{-2}$ (1 mAh·cm$^2$).

FIGS. 6a-6b illustrate performance graphs of various lithium-ion batteries. FIG. 6a is a performance graph of a lithium-ion battery comprising a lithium electrode and lithium iron phosphate, and 5 mAh·cm$^{-2}$ of lithium was deposited on a normal copper foil supporter to obtain the lithium electrode by an electrodeposition method. FIG. 6b illustrates a performance graph of the lithium-ion battery prepared according to Embodiment 20.

DETAILED DESCRIPTION OF THE EMBODIMENTS

The present disclosure will be further disclosed below in combination with the accompanying embodiments and drawings.

FIG. 1 illustrates an electrochemical cell for step 1) and an electrochemical cell for step 2) achieving a supporter of lithium metal of the present disclosure. The electrochemical cell for step 1) is disposed with an electrode chamber A. The electrode chamber A is filled with electrolyte B, and the electrode chamber A is disposed with a working electrode C and a counter electrode D. The working electrode C and the counter electrode D in the electrode chamber A are connected to a potentiostat E, respectively, to control potentiostatic or galvanostatic polarization of the working electrode C. The electrochemical cell for step 2) is disposed with an electrode chamber F. The electrode chamber F is filled with electrolyte G, and the electrode chamber F is disposed with a working electrode H, a counter electrode I, and a reference electrode J. The working electrode H, the counter electrode I, and the reference electrode J in the electrode chamber F are connected to a potentiostat K, respectively, to control potentiostatic or galvanostatic polarization of the working electrode H.

The specific embodiments are as follows, but the scope of the present disclosure is not limited to the specific embodiments described below and covers any combinations of the specific embodiments.

Embodiment 1

A preparation of the supporter of lithium metal was as follows.

1) A copper supporter or a nickel supporter was put into the electrochemical cell to function as a working electrode. An electropolishing solution was injected into the electrochemical cell (electropolishing solutions for copper or nickel might be used in the present disclosure). The working electrode was subjected to an anodic potential of 1.0-2.0 V or an anodic current of 100-300 mA/cm$^2$ to enable metal to be stripped from the working electrode, and a reaction time was 15-60 seconds.

2) After a metal dissolution reaction was completed, the copper supporter or the nickel supporter of the working electrode was taken out, washed and cleaned with water (i.e., deionized water or secondary water), and put in the electrochemical cell again to function as the working electrode. The electropolishing solution in the electrochemical cell was replaced by 0.5-2.0 M (mol/L) of an electrolyte of soluble copper salt or an electrolyte of soluble nickel salt with a 1-20 mM (mmol/L) crystal face capping agent. The working electrode was subjected to −0.2 to −0.05 V of a cathodic potential or −0.1 to −0.05 mA/cm$^2$ of a cathodic current to enable metal ions in the electrolyte of soluble metal copper salt or the electrolyte of soluble metal nickel salt with the 1-20 mM crystal face capping agent to be deposited on the working electrode, and a reaction time was 10-60 minutes. The crystal face capping agent can be potassium chloride, sodium chloride, hydrochloric acid, sodium sulfate, potassium sulfate, sulfuric acid, polyvinylpyrrolidone, or cetyltrimethylammonium chloride.

When step 1) and step 2) were completed, a supporter of lithium metal with a flat Cu(100) preferred surface (i.e., flat Cu(100) preferred orientation) or a flat Ni(100) preferred surface (i.e., flat Ni(100) preferred orientation) was obtained.

Embodiment 2

This embodiment differs from Embodiment 1 in that in step 1), a copper foil was used as the working electrode, the anodic potential applied to the working electrode to enable metal to be stripped from the working electrode was 2.0 V, and the reaction time was 15 seconds. The rest of the process was the same as the process of Embodiment 1.

Embodiment 3

This embodiment differs from Embodiment 1 in that in step 1), a copper mesh was used as the working electrode, the anodic potential applied to the working electrode to enable metal to be stripped from the working electrode was 1.0 V, and the reaction time was 60 seconds. The rest of the process was the same as the process of Embodiment 1.

Embodiment 4

This embodiment differs from Embodiment 1 in that in step 1), a copper foil was used as the working electrode, the anodic potential applied to the working electrode to enable metal to be stripped from the working electrode was 1.5 V, and the reaction time was 40 seconds. The rest of the process was the same as the process of Embodiment 1.

Embodiment 5

This embodiment differs from Embodiment 1 in that in step 1), a foamed copper was used as the working electrode, the anodic current applied to the working electrode to enable metal to be stripped from the working electrode was 100 mA/cm$^2$, and the reaction time was 60 seconds. The rest of the process was the same as the process of Embodiment 1.

Embodiment 6

This embodiment differs from Embodiment 1 in that in step 1), the anodic current applied to the working electrode to enable metal to be stripped from the working electrode was 300 mA/cm$^2$, and the reaction time was 15 seconds. The rest of the process was the same as the process of Embodiment 1.

Embodiment 7

This embodiment differs from Embodiment 1 in that in step 1), the anodic current applied to the working electrode to enable metal to be stripped from the working electrode was 200 mA/cm$^2$, and the reaction time was 30 seconds. The reset of the process was the same as the process of Embodiment 1.

Embodiment 8

This embodiment differs from Embodiment 1 in that in step 2), the electrolyte of soluble copper salt or the electrolyte of soluble nickel salt with the 1-20 mM crystal face capping agent comprised 0.5 M of a copper sulfate electrolyte comprising 1 mM of hydrochloric acid. The rest of the process was the same as the process of one of Embodiments 1-7.

Embodiment 9

This embodiment differs from Embodiment 1 in that in step 2), the electrolyte of soluble copper salt or the electrolyte of soluble nickel salt with the 1-20 mM crystal face capping agent comprised 2.0 M of a copper sulfate electrolyte comprising 20 mM of potassium chloride. The rest of the process was the same as the process of one of Embodiments 1-7.

Embodiment 10

This embodiment differs from Embodiment 1 in that in step 2), the electrolyte of soluble copper salt or the electrolyte of soluble nickel salt with the 1-20 mM crystal face capping agent comprised 1 M of a copper sulfate electrolyte comprising 10 mM of sodium chloride. The rest of the process was the same as the process of one of Embodiments 1-7.

Embodiment 11

This embodiment differs from Embodiment 1 in that in step 2), the cathodic potential applied to the working electrode to enable metal to be deposited on the working electrode was −0.2 V, and the reaction time was 10 minutes. The rest of the process was the same as the process of one of Embodiments 1-10.

Embodiment 12

This embodiment differs from Embodiment 1 in that in step 2), the cathodic potential applied to the working electrode to enable metal to be deposited on the working electrode was −0.05 V, and the reaction time was 60 minutes. The rest of the process was the same as the process of one of Embodiments 1-10.

Embodiment 13

This embodiment differs from Embodiment 1 in that in step 2), the cathodic potential applied to the working electrode to enable metal to be deposited on the working electrode was −0.1 V, and the reaction time was 30 minutes. The rest of the process was the same as the process of one of Embodiments 1-10.

Embodiment 14

This embodiment differs from Embodiment 1 in that in step 2), the cathodic current applied to the working electrode to enable metal to be deposited on the working electrode was −0.1 mA/cm$^2$, and the reaction time was 10 minutes. The rest of the process was the same as the process of one of Embodiments 1-10.

Embodiment 15

This embodiment differs from Embodiment 1 in that in step 2), the cathodic current applied to the working electrode to enable metal to be deposited on the working electrode was −0.05 mA/cm$^2$, and the reaction time was 60 minutes. The rest of the process was the same as the process of one of Embodiments 1-10.

Embodiment 16

This embodiment differs from Embodiment 1 in that in step 2), the cathodic current applied to the working electrode to enable metal to be deposited on the working electrode was −0.07 mA/cm$^2$, and the reaction time was 30 minutes. The rest of the process was the same as the process of one of Embodiments 1-10.

Embodiment 17

This embodiment differs from Embodiment 1 in that in step 1), a nickel foil was used as the working electrode, the anodic current applied to the working electrode to enable metal to stripped from the working electrode was 100 mA/cm$^2$, and the reaction time was 60 seconds. In step 2), the cathodic current applied to the working electrode to enable metal to be deposited on the working electrode was −0.05 mA/cm$^2$, and the reaction time was 60 minutes. The rest of the process was the same as the process of Embodiment 1.

Embodiment 18

This embodiment differs from Embodiment 1 in that in step 1), a foamed nickel was used as the working electrode. In step 2), the electrolyte of soluble copper salt or the electrolyte of soluble nickel salt with the 1-20 mM crystal face capping agent comprised 1 M of a nickel sulfate electrolyte comprising 10 mM of sodium chloride. The rest of the process was the same as the process of Embodiment 1 or Embodiment 17.

Embodiment 19

After a supporter of lithium metal was obtained in one or any combinations of Embodiments 1-18 or other embodiments, the supporter of lithium metal and lithium metal were assembled to obtain a battery. 1.0 M LiTFSI/DME-DOL (1/1, V/V) was used as an electrolyte, and Celgard 2400 was used as a separator.

Embodiment 20

After a supporter of lithium metal was obtained in one or any combinations of Embodiments 1-18 or other embodiments, 5 mAh·cm$^{-2}$ of lithium metal was deposited on the supporter of lithium metal to obtain a lithium thin film electrode (i.e., a lithium thin film anode) by an electrodeposition method, and the lithium thin film electrode and lithium iron phosphate were assembled to obtain a lithium-ion battery. 1.0 M LiPF$_6$/EC-DMC-EMC (1/1/1, V/V/V) was used as an electrolyte, and Celgard 2400 was used as a separator.

Embodiment 21

After a supporter of lithium metal was obtained in one or any combinations of Embodiments 1-18 or other embodiments, 5 mAh·cm$^2$ of lithium metal was deposited on the supporter of lithium metal to obtain a lithium thin film electrode (i.e., a lithium thin film anode) by an electrodeposition method, and the lithium thin film electrode and a sulfur cathode were then assembled to obtain a lithium-sulfur battery. 1.0 M LiTFSI+0.5M LiNO$_3$/DME-DOL (1/1, V/V) was used as an electrolyte, and Celgard 2400 was used as a separator.

Embodiment 22

After a supporter of lithium metal was obtained in one or any combinations of Embodiments 1-18 or other embodiments, 5 mAh·cm$^{-2}$ lithium was introduced into the supporter of lithium metal to obtain a lithium thin film electrode (i.e., a lithium thin film anode) by a molten lithium covering method, and the lithium thin film anode and a Super P positive electrode were then assembled to obtain a lithium-oxygen battery. 1.0M LiTFSI+0.5M LiNO$_3$/DME-DOL (1/1, V/V) comprising saturated oxygen was used as an electrolyte, and Celgard 2400 was used as a separator.

An analysis of test results of the aforementioned embodiments is as follows.

FIG. 2a-2b illustrate scanning electron micrographs (SEMs) of a normal copper foil supporter and a copper foil supporter with a flat lithiophilic surface prepared according to Embodiment 2. FIG. 2a illustrates the normal copper foil supporter, and FIG. 2b illustrates the copper foil supporter with the flat lithiophilic surface prepared according to Embodiment 2. Referring to FIG. 2a, a surface of the normal copper foil supporter is very rough. However, referring to FIG. 2b, a surface of the copper foil supporter with the flat lithiophilic surface prepared according to Embodiment 2 comprised large polyhedral crystals, and the surface is relatively flat.

FIG. 3a-3b illustrate cyclic voltammograms of the normal copper foil supporter and a copper foil supporter with a flat lithiophilic surface prepared according to Embodiment 4 in a Pb(ClO$_4$)$_2$ aqueous solution. FIG. 3a illustrates the normal copper foil supporter, and FIG. 3b illustrates the copper foil supporter with the flat lithiophilic surface prepared according to Embodiment 4. Referring to FIGS. 3a-3b, the normal copper foil supporter and the copper foil supporter with the flat lithiophilic surface both show two cathode peaks at −0.35 V and −0.39 V corresponding to underpotential deposition peaks of Pb on a lithiophobic Cu(111) surface and a lithiophilic Cu(100) surface, respectively. Charges of the two cathode peaks of the normal copper foil supporter and the copper foil supporter with the flat lithiophilic surface are obviously different. With respect to the normal copper foil supporter, the underpotential deposition peak of Pb at the lithiophobic Cu(111) surface is more obvious. While with respect to the copper foil supporter with the flat lithiophilic surface prepared according to Embodiment 4, the underpotential position peak of Pb at the lithiophilic Cu(100) surface is more obvious. Therefore, the copper foil supporter with the flat lithiophilic surface prepared according to Embodiment 4 defines an obvious lithiophilic surface.

FIGS. 4a-4b illustrate cyclic voltammograms of the normal copper foil supporter and a copper foil supporter with a flat lithiophilic surface prepared according to Embodiment 10 in a LiTFSI/DME-DOL (1/1, V/V) solution. FIG. 4a illustrates the normal copper foil supporter, and FIG. 4b illustrates the copper foil supporter with the flat lithiophilic surface prepared according to Embodiment 10. Referring to FIGS. 4a-4b, the normal copper foil supporter shows an underpotential deposition peak of lithium on the Cu(111) preferred surface at about 0.45 V, while the copper foil supporter with the flat lithiophilic surface prepared according to Embodiment 10 shows an underpotential deposition peak of lithium on the Cu(100) preferred surface at about 0.6 V. Therefore, the copper foil supporter with the flat lithiophilic surface prepared according to Embodiment 10 defines an obvious lithiophilic surface. At the same time, an overpotential deposition of lithium on the copper foil supporter with the flat lithiophilic surface prepared according to Embodiment 10 is significantly lower than an overpotential deposition of lithium on the normal copper foil supporter. Therefore, the copper foil supporter with the flat lithiophilic surface is more beneficial to the lithium nucleation and growth and thus the subsequent evenly and smoothly lithium electrodeposition.

FIG. 5a-5b illustrate performance graphs of a normal copper mesh supporter and a copper mesh supporter with a flat lithiophilic surface prepared according to Embodiment 17 directly used as lithium-free electrodes. FIG. 5a illustrates a cyclic coulombic efficiency diagram of a copper-lithium battery comprising the normal copper mesh supporter and a lithium metal electrode at 4 mA·cm$^{-2}$ (1 mAh·cm$^{-2}$), and FIG. 5b illustrates a cyclic Coulombic efficiency diagram of a copper-lithium battery comprising the copper mesh supporter with the flat lithiophilic surface prepared according to Embodiment 17 and a lithium metal electrode at 4 mA·cm$^{-2}$ (1 mAh·cm$^{-2}$). Referring to FIG. 5a, the lithium metal can be only circulated for about 35 cycles on the normal copper mesh supporter, and a Coulombic efficiency is only 95%. While, referring to FIG. 5b, the lithium metal can be stably circulated for at least 400 cycles on the copper mesh supporter with the flat lithiophilic surface prepared according to Embodiment 17, and a Coulombic efficiency is as high as 97%. Therefore, the copper mesh supporter with the flat lithiophilic surface shows a significantly improved Coulombic efficiency and has significantly longer cycle stability.

FIGS. 6a-6b illustrate performance graphs of various lithium-ion batteries. FIG. 6a illustrates a performance graph of a lithium-ion battery comprising a lithium electrode prepared by depositing 5 mAh·cm$^{-2}$ of lithium metal on a normal copper foil supporter by an electrodeposition method and lithium iron phosphate. FIG. 6b illustrates a performance graph of the lithium-ion battery prepared according to Embodiment 20. Referring to FIG. 6a, the lithium-ion battery comprising the lithium electrode prepared by depositing 5 mAh·cm$^{-2}$ of metal lithium on the normal copper foil supporter and the lithium iron phosphate can only be circulated for about 50 cycles, and a Coulombic efficiency is only 96.3%. However, referring to FIG. 6b, the lithium-ion battery prepared according to Embodiment 20 can be stably circulated for at least 100 cycles, and a Coulombic efficiency is as high as 99.7%. Therefore, a lithium thin film anode prepared by a supporter with the flat lithiophilic surface (i.e., the copper mesh supporter with the flat lithiophilic surface) can improve performance of the lithium-ion batteries.

What is claimed is:
1. A supporter of lithium metal, wherein:
   a material of the supporter of lithium metal is at least one of copper, an alloy of the copper, nickel, or an alloy of the nickel,
   a surface of the supporter of lithium metal defines a lithiophilic surface,
   the lithiophilic surface has a mainly Cu(100) orientation or a mainly Ni(100) orientation, and
   when cyclic voltammograms of the supporter of lithium metal are detected in a Pb(ClO$_4$)$_2$ aqueous solution:
      an area of an underpotential deposition peak of the supporter of lithium metal located at −0.39 V is greater than an area of an underpotential deposition peak of the supporter of lithium metal located at

−0.35 V to obtain the mainly Cu(100) orientation or the mainly Ni(100) orientation, wherein the area of the underpotential deposition peak of the supporter of lithium metal located at −0.35 V is larger than 0.

2. The supporter of lithium metal according to claim 1, wherein a configuration of the supporter of lithium metal comprises at least one of a flat foil, a three-dimensional mesh, a three-dimensional foam, or a three-dimensional cylinder.

3. A method for preparing a supporter of lithium metal, wherein:
a material of the supporter of lithium metal is at least one of copper, an alloy of the copper, nickel, or an alloy of the nickel,
a surface of the supporter of lithium metal defines a lithiophilic surface, and
the method comprises:
  1) putting a supporter into an electrochemical cell functioning as a working electrode, injecting an electropolishing solution, and applying anodic potential or anodic current to the working electrode to enable a metal to be stripped from the working electrode, wherein the anodic potential is 1-2 V, the anodic current is 100-300 mA/cm$^2$, and a reaction time is 15-60 seconds; and
  2) injecting an electrolyte comprising a crystal face capping agent into the electrochemical cell after step 1) is complete, applying cathodic potential or cathodic current to the working electrode to enable the metal to be deposited.

4. The method according to claim 3, wherein in step 1), a material of the supporter is at least one of the copper, the alloy of the copper, the nickel, or the alloy of the nickel.

5. The method according to claim 3, wherein the crystal face capping agent comprises at least one of potassium chloride, sodium chloride, hydrochloric acid, sodium sulfate, potassium sulfate, sulfuric acid, polyvinylpyrrolidone, or cetyltrimethylammonium chloride.

6. The method according to claim 3, wherein:
in step 2), the cathodic potential is −0.2 to −0.05 V, the cathodic current is −0.1 to −0.05 mA/cm$^2$, and a reaction time is 10-60 minutes.

7. A method comprising:
applying the supporter of lithium metal according to claim 1 to function as a lithium-free anode in a lithium-ion battery, or
applying the supporter of lithium metal in a lithium thin film anode of a secondary battery by electrodeposition or a molten lithium covering method.

8. The method according to claim 7, wherein:
the secondary battery comprises one of the lithium-ion battery, a lithium-sulfur battery, or a lithium-oxygen battery.

9. A method for preparing a supporter of lithium metal, wherein:
a material of the supporter of lithium metal is at least one of copper, an alloy of the copper, nickel, or an alloy of the nickel,
a surface of the supporter of lithium metal defines a lithiophilic surface, and
the method comprises:
  1) putting a supporter into an electrochemical cell functioning as a working electrode, injecting an electropolishing solution, and applying anodic potential or anodic current to the working electrode to enable a metal to be stripped from the working electrode; and
  2) injecting an electrolyte comprising a crystal face capping agent into the electrochemical cell after step 1) is complete, applying cathodic potential or cathodic current to the working electrode to enable the metal to be deposited, wherein the cathodic potential is −0.2 to −0.05 V, the cathodic current is −0.1 to −0.05 mA/cm$^2$, and a reaction time is 10-60 minutes.

10. The method according to claim 9, wherein in step 1), a material of the supporter is at least one of the copper, the alloy of the copper, the nickel, or the alloy of the nickel.

11. The method according to claim 9, wherein the crystal face capping agent comprises at least one of potassium chloride, sodium chloride, hydrochloric acid, sodium sulfate, potassium sulfate, sulfuric acid, polyvinylpyrrolidone, or cetyltrimethylammonium chloride.

* * * * *